(No Model.) 8 Sheets—Sheet 4.

D. L. CHANDLER & G. J. BURNS.
MACHINE FOR CUTTING HEEL STIFFENER BLANKS.

No. 540,779. Patented June 11, 1895.

Witnesses:
Walter E. Lombard.
H. Theodore Fletcher

Inventors:
Daniel L. Chandler,
George J. Burns,
by N. C. Lombard,
Attorney.

(No Model.) 8 Sheets—Sheet 5.

D. L. CHANDLER & G. J. BURNS.
MACHINE FOR CUTTING HEEL STIFFENER BLANKS.

No. 540,779. Patented June 11, 1895.

Figure 5:
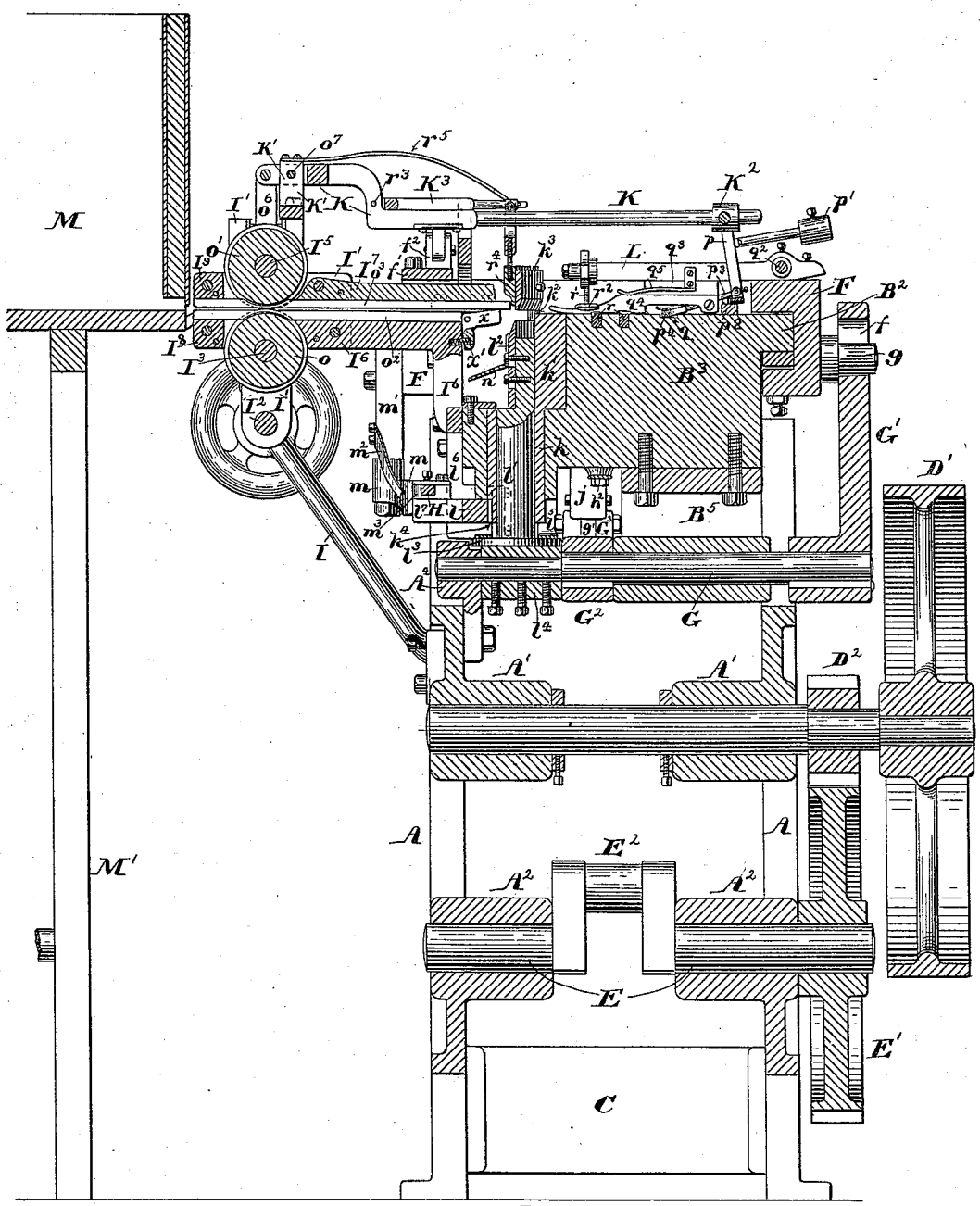

Witnesses: Fig. 5. Inventors:
Daniel L. Chandler,
George J. Burns,
by N. C. Lombard,
Attorney.

(No Model.) 8 Sheets—Sheet 6.
D. L. CHANDLER & G. J. BURNS.
MACHINE FOR CUTTING HEEL STIFFENER BLANKS.

No. 540,779. Patented June 11, 1895.

Witnesses:
Walter E. Lombard
H. Theodore Fletcher

Inventors:
Daniel L. Chandler,
George J. Burns,
by N. C. Lombard.
Attorney.

(No Model.) 8 Sheets—Sheet 7.
D. L. CHANDLER & G. J. BURNS.
MACHINE FOR CUTTING HEEL STIFFENER BLANKS.
No. 540,779. Patented June 11, 1895.

Witnesses:
Walter E. Lombard.
H. Theodore Fletcher.

Inventors:
Daniel L. Chandler,
George J. Burns,
by N. C. Lombard,
Attorney.

(No Model.)  8 Sheets—Sheet 8.

D. L. CHANDLER & G. J. BURNS.
MACHINE FOR CUTTING HEEL STIFFENER BLANKS.

No. 540,779. Patented June 11, 1895.

Witnesses:
Walter E. Lombard.
H. Theodore Fletcher.

Inventors:
Daniel L. Chandler,
George J. Burns,
by N. C. Lombard
Attorney.

UNITED STATES PATENT OFFICE.

DANIEL L. CHANDLER AND GEORGE J. BURNS, OF AYER, ASSIGNORS TO THE SPAULDING BROTHERS COMPANY, OF TOWNSEND, MASSACHUSETTS.

MACHINE FOR CUTTING HEEL-STIFFENER BLANKS.

SPECIFICATION forming part of Letters Patent No. 540,779, dated June 11, 1895.

Application filed March 12, 1895. Serial No. 541,427. (No model.)

*To all whom it may concern:*

Be it known that we, DANIEL L. CHANDLER and GEORGE J. BURNS, of Ayer, in the county of Middlesex and State of Massachusetts, have invented certain new and useful Improvements in Machines for Cutting Heel-Stiffener Blanks, of which the following, taken in connection with the accompanying drawings, is a specification.

Our invention relates to machines for cutting heel stiffener blanks and it consists in certain novel features of construction, arrangement and combination of parts which will be readily understood by reference to the description of the accompanying drawings and in the claims hereto appended and in which our invention is clearly pointed out.

Figure 1:
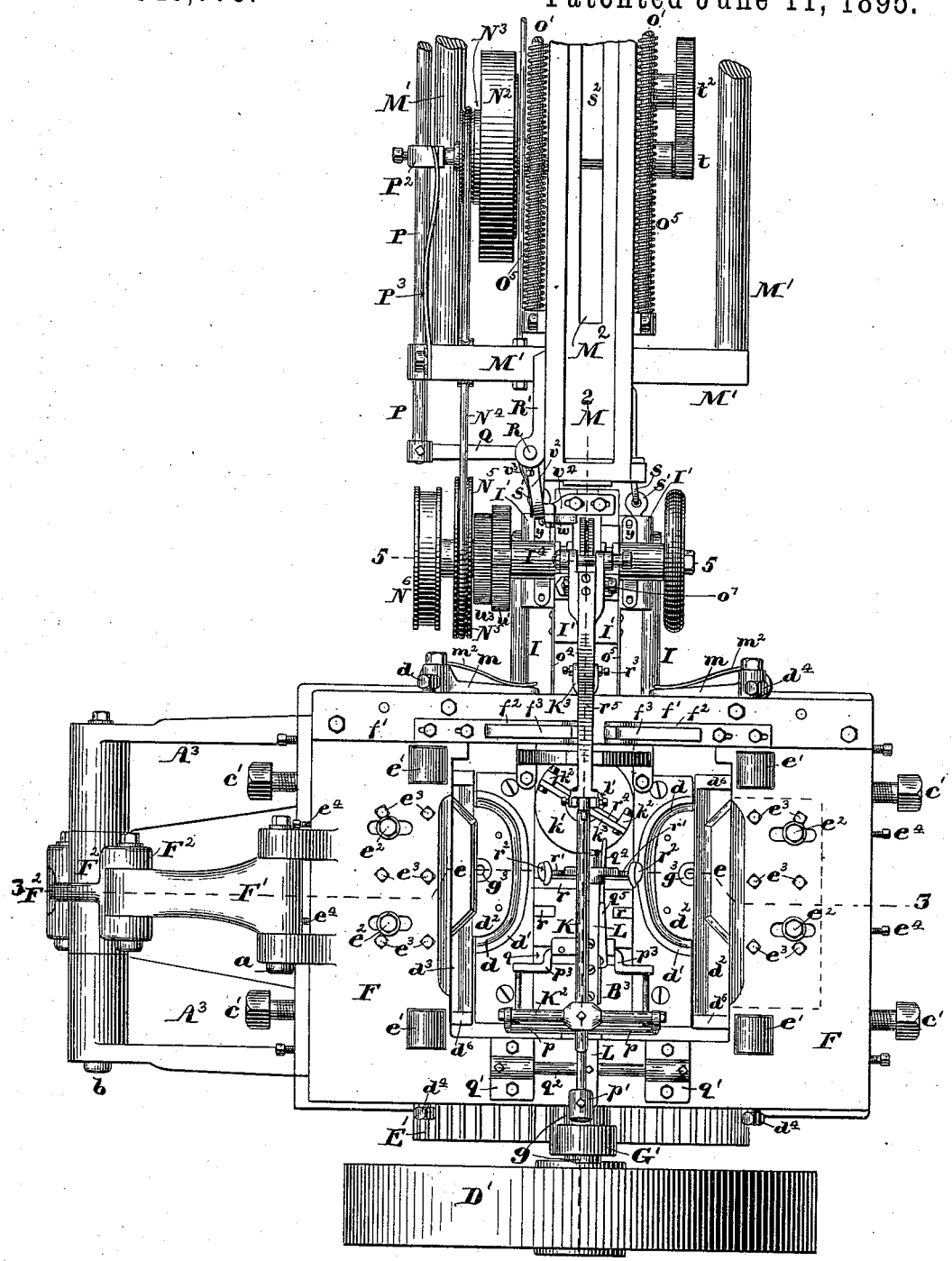
Figure 2:
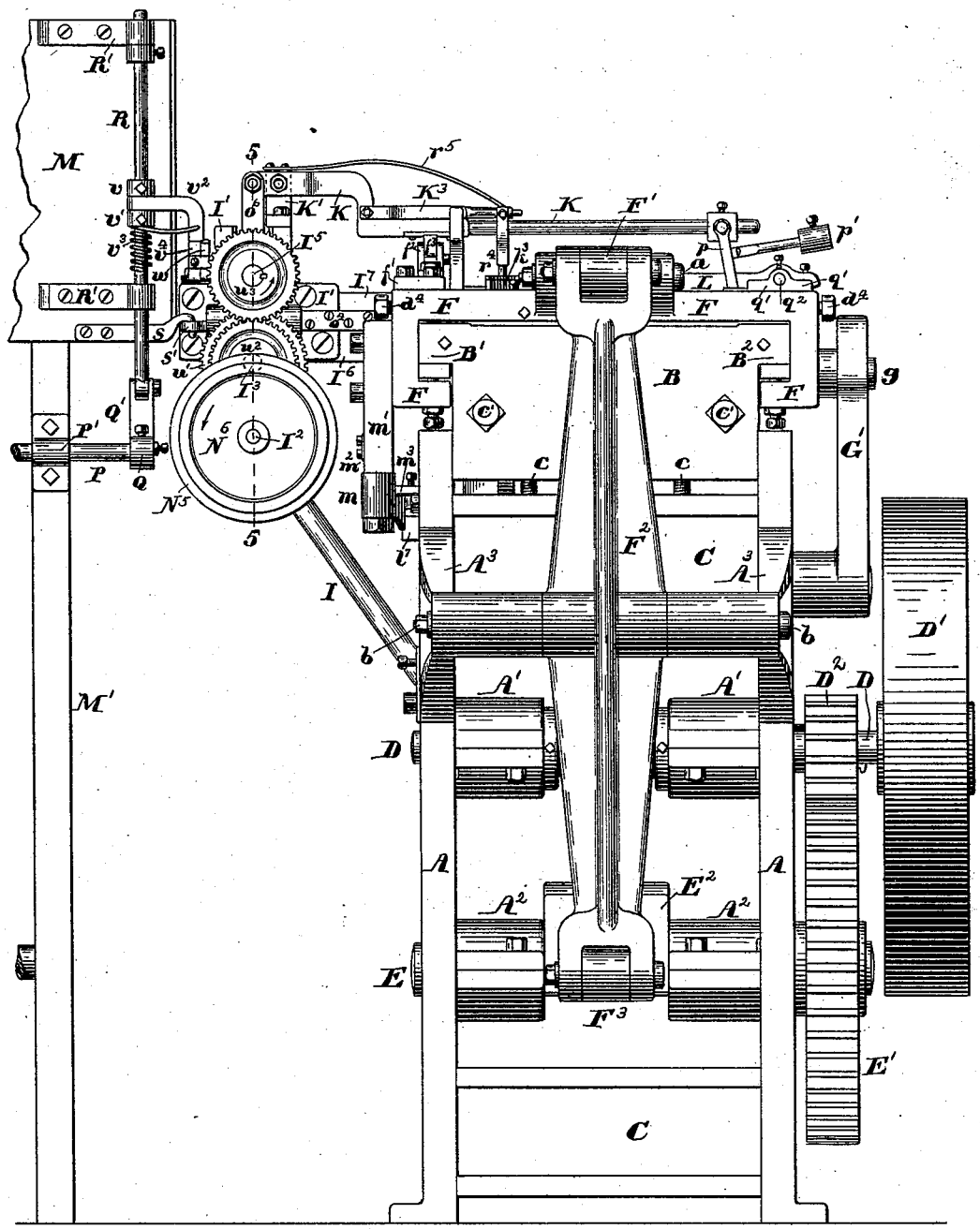
Figure 3:
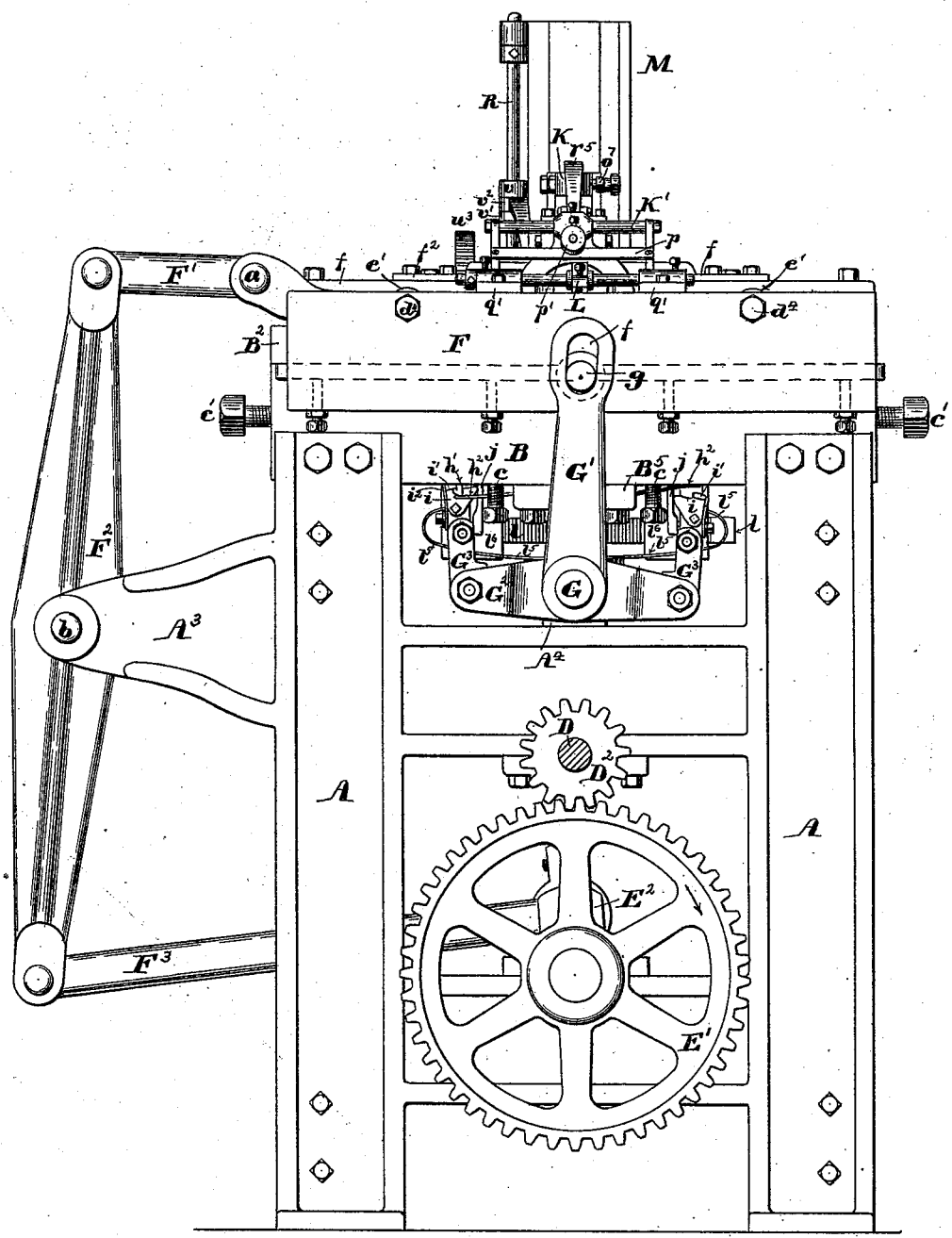
Figure 4:
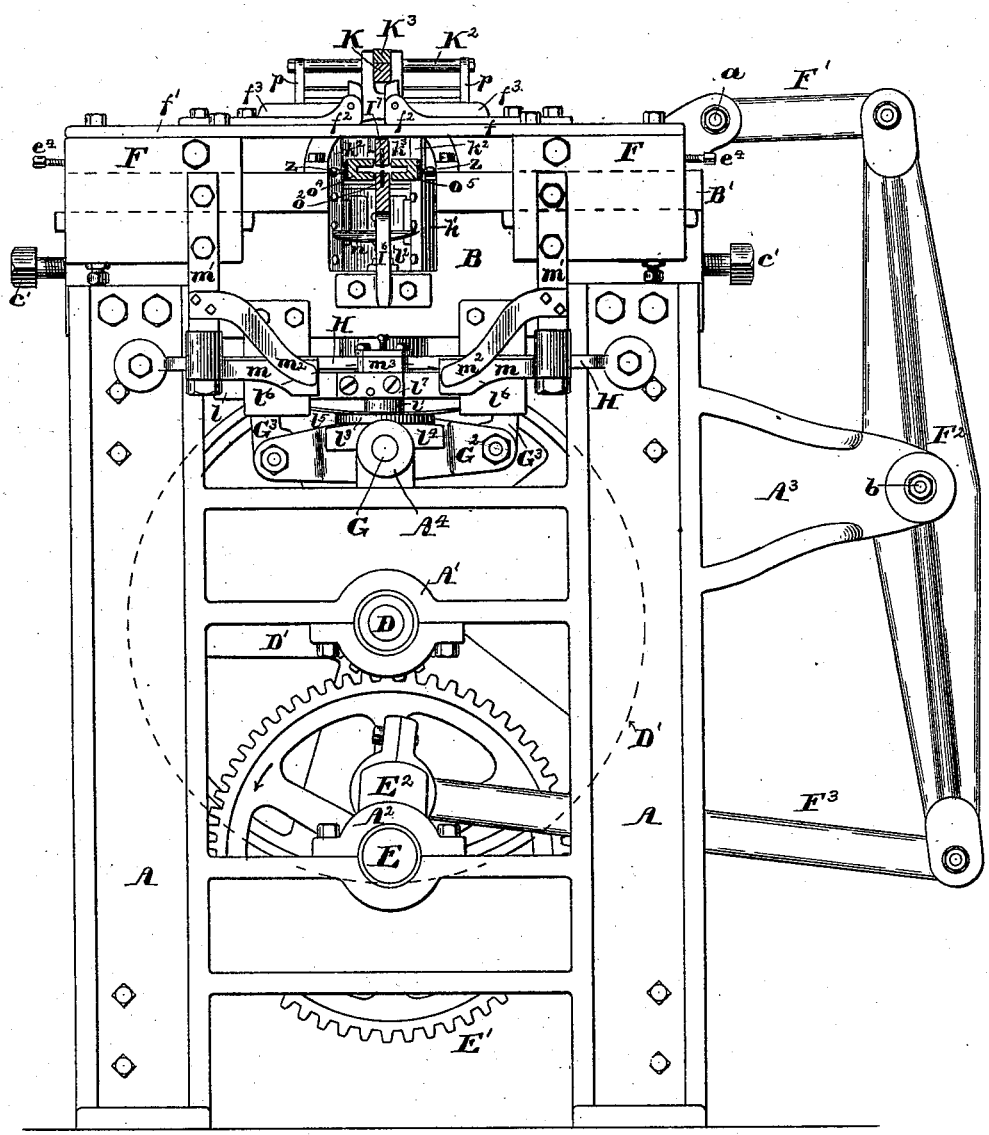
Figure 6:
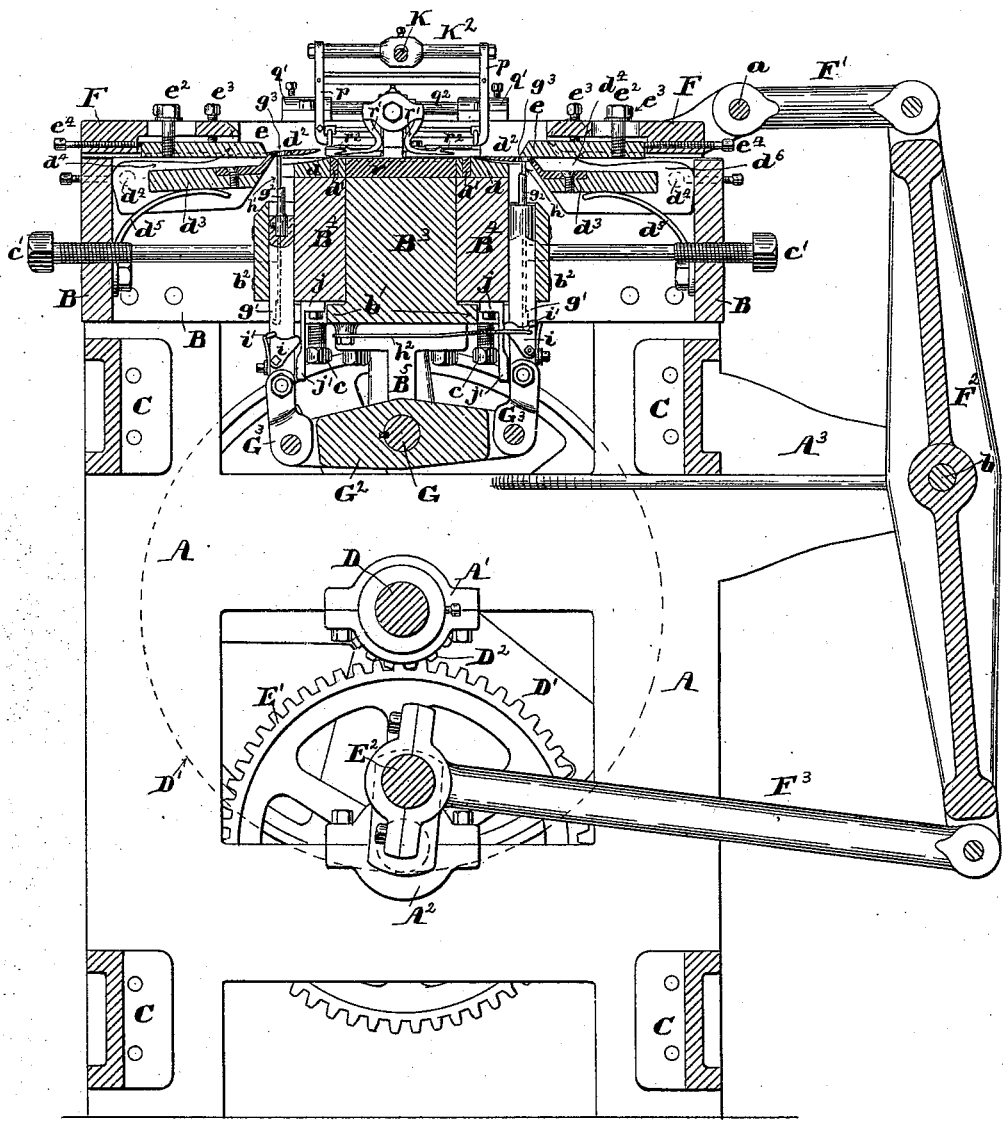
Figure 8:
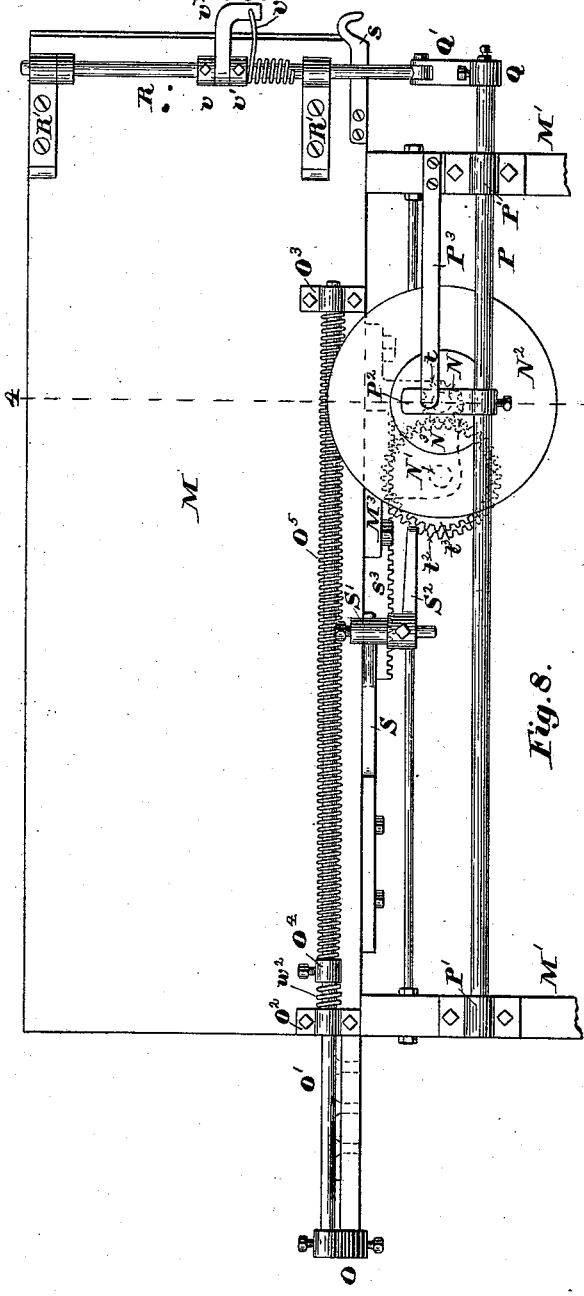
Figure 7:
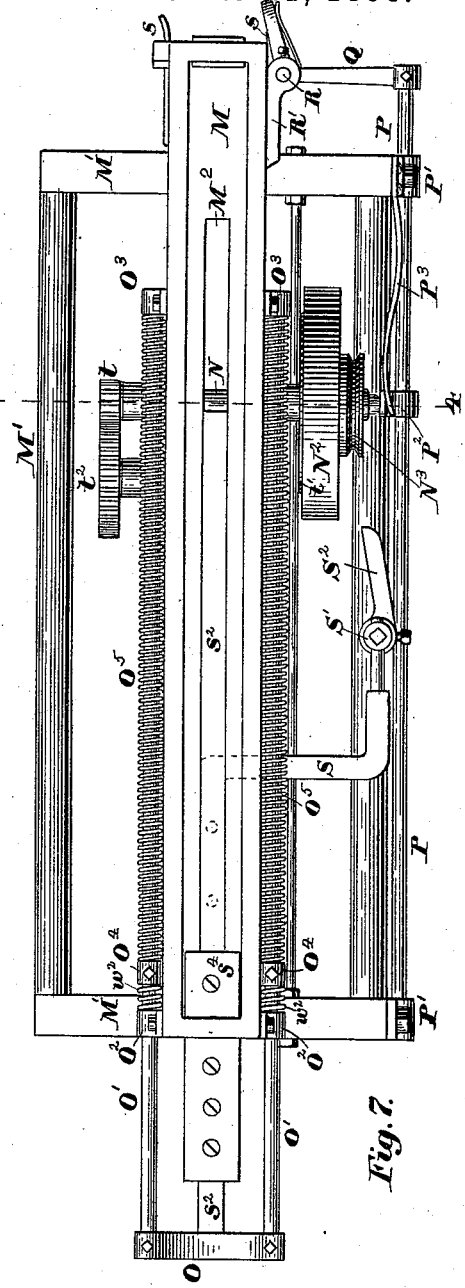
Figures 16, 17:
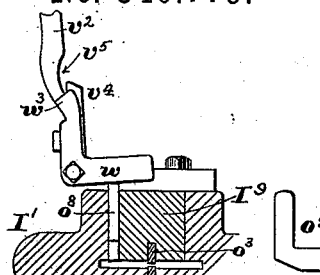
Figures 11, 12:
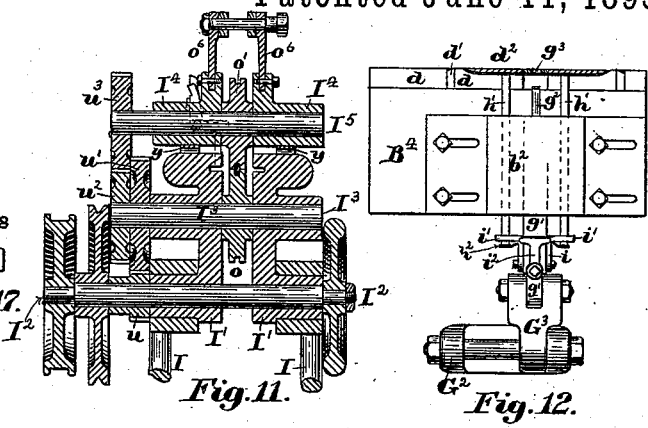
Figures 9, 10:
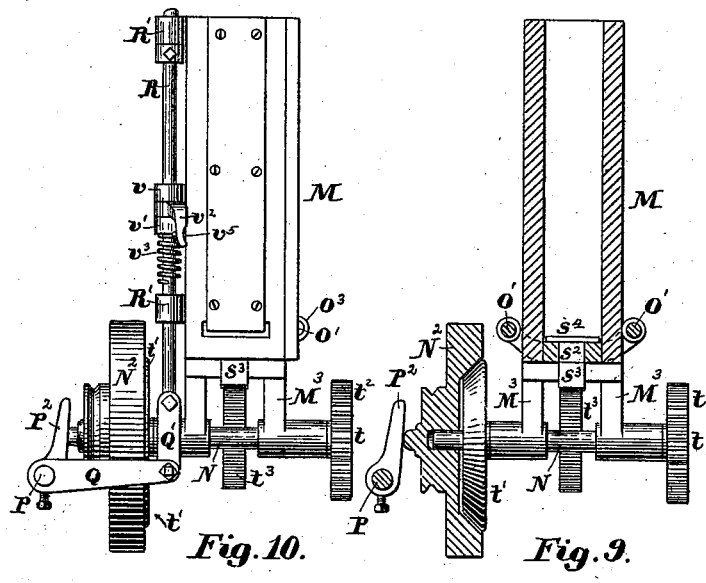
Figures 13, 14:
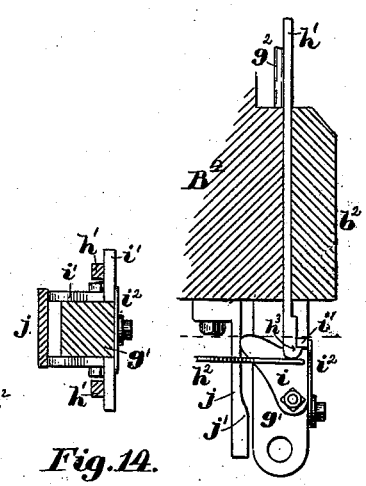
Figures 15, 19:
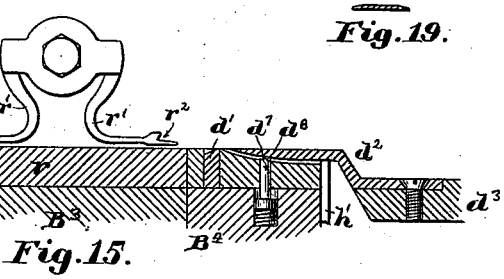
Figures 18, 20:
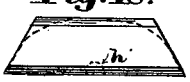

Figure 1 is a plan of the main body of the machine and a portion of the feeding attachment. Fig. 2 is a side elevation of the same. Fig. 3 is an elevation of the same looking toward the inner end of the feed-hopper. Fig. 4 is an elevation of the side of the main body of the machine opposite to that shown in Fig. 3, with the feed-tube cut in section and the fly-wheel removed. Fig. 5 is a vertical section on line 2 2 of Fig. 1. Fig. 6 is a vertical section on line 3 3 of Fig. 1. Fig. 7 is a plan of the feed-hopper and mechanism. Fig. 8 is a side elevation of said hopper and mechanism. Fig. 9 is a transverse section of said hopper and feed mechanism on line 4 4 of Figs. 7 and 8, looking toward the left of said figures. Fig. 10 is an elevation of the inner end of said hopper and its mechanism. Fig. 11 is a transverse section through that portion of the feed mechanism permanently attached to the main body of the machine, on line 5 5 of Figs. 1 and 2. Figs. 12, 13, and 14 are respectively an elevation, a sectional elevation, and a horizontal section illustrating the vertically movable stops and their operating mechanism. Fig. 15 is an enlarged transverse section through the molds and depressors and showing the yielding spurs therein and the discharge-fingers in elevation. Figs. 16 and 17 are details illustrating the tripping mechanism for stopping the hopper-feed. Fig. 18 is an elevation of a portion of a strip of leather-board from which the blanks are to be cut. Fig. 19 is a transverse section of said strip; and Fig. 20 is an elevation of a section of said strip of the proper length and shape to be delivered to the mold, and illustrates by dotted lines the form of the blank after being pressed into the mold and subjected to the action of the skiving-knife. Figs. 13, 14, 15, 16, and 17 are drawn to an enlarged scale.

This machine is designed for cutting heel stiffener blanks from strips of leather board, which are skived or beveled along their two longest and parallel edges, both of said skivings being upon the same side of the strip as shown in Figs. 18 and 19.

In order to reduce to the minimum the waste of material it is customary in cutting heel stiffener blanks to separate said strips into sections of the desired length by a series of cuts oblique to the edges of the strip alternately in opposite directions as illustrated in Figs. 18 and 20. It is very desirable that the skiving should all be upon the same side of the blank, and to accomplish this and at the same time automatically feed the strips of material to the severing knife and the severed sections to the molds, and thus increase the capacity of the machine is the object of our invention, and to this end we construct the machine as illustrated in the accompanying drawings, in which—

A A are the side frames of the main body of the machine, which are connected together by the bed B and the girts C, C, as shown.

The frames A, A, have formed thereon the boxes A' and A² in which are mounted respectively the driving shaft D and the crank shaft E. The shaft D has firmly secured upon one end thereof the driving pulley D', and the pinion D², which engages the spur gear wheel E' secured upon one end of the shaft E, and said shaft E has formed therein between the bearings A², A², the crank E² all as shown in Figs. 5 and 6.

The bed B is provided upon two opposite sides thereof with the lips B' and B² which form guide-ways for the reciprocating frame F, mounted thereon, and having pivoted thereto, at $a$, one end of the link F', the opposite end of which is pivoted to the upper end of the lever F², fulcrumed on a shaft $b$ mounted in the ears A³ projecting from the frames A, A, and having pivoted to its lower end one end of the connecting rod $F^3$, the opposite end of which is mounted upon the crank pin $E^2$, so that at each revolution of the crank shaft, the frame F will have imparted thereto a complete reciprocation.

The bed B is a skeleton frame having two side and two end bars and a central bar $B^3$ having flanges $b'$, $b'$, at its lower edge to support the bars $B^4$ $B^4$ which are adjustable vertically by means of the set-screws $cc$ and are clamped against the bar $B^3$ by the set screws $c'$, $c'$, as shown in Fig. 6. Each of the bars $B^4$ has secured to its upper side a mold $d$ having an outline as viewed in plan corresponding to the desired shape to be given to the counter blank and having a hardened steel rim $d'$ which co-operates with the reciprocating knife to cut away the surplus material projecting above said rim when the piece of material has been pressed into the mold $d$ by the presser plate $d^2$ secured to the plate $d^3$ pivoted to the bed B at $d^4$ and normally pressed upward by the spring $d^5$ as shown in Fig. 6.

The reciprocating frame F has adjustably secured to the under side of each end plate a skiving knife $e$, said knives being arranged with their cutting edges toward each other and so arranged that when moved toward the center of the machine each knife will cut away the surplus stock projecting above the steel cutting rim of its mold. The frame F also carries four anti friction rolls $e'$, $e'$, arranged in openings in the end plates of said frame, two in each, so as to roll upon the upper surface of the bed B to support the weight of the frame F and at the same time act upon the cam shaped upper surface of the ear ribs $d^6$ of the plate $d^3$ to move the presser-plates $d^2$ downward to press the material into the mold and clamp it in position therein while the skiving knife is cutting away the surplus material.

The skiving knives $e, e$, are clamped to the frame F by the bolts $e^2$, $e^2$, passing through slots in said frame and screwed into said knives, and are adjustable vertically by the set-screws $e^3$, $e^3$, and horizontally by the set-screws $e^4$ $e^4$ as shown in Figs. 1 and 6.

The bar $B^3$ of the bed B has bolted to its under side the pendent stand $B^5$ in a bearing in which is mounted the rocker-shaft G which has an additional bearing in the stand $A^4$ secured to the left hand frame A, and has firmly secured upon its other end the radius arm $G'$ having formed in its movable end a slot $f$ with which the stud $g$, set in the side of the frame F, engages to impart to said shaft an oscillating motion about its axis as the frame F is reciprocated by the rotation of the crank shaft.

The shaft G has firmly secured thereon the two armed lever $G^2$ connected at each end by a link $G^3$ to a vertically reciprocating plunger $g'$ in the upper end of which is set the cutting punch $g^2$ which co-operates with an opening or female die $g^3$ in the presser-plate to cut the notch $h$ in the center of the long edge of the blank as shown in Fig. 20 said plunger being fitted to a bearing in the side of the bar $B^4$ and held therein by the cap $b^2$. Bearings are also formed between said bar $B^4$ and cap $b^2$ for two vertically movable rods or bars $h'$, $h'$, which serve as stops to limit the lateral movement of the blank of material when it is fed into position above the mold $d$. These rods or bars $h'$ are normally held in their uppermost position by springs $h^2$ and are provided at their lower ends with a shoulder $h^3$ with which the arm $i'$ on the latch lever $i$ pivoted to the plunger $g'$, engages when said plunger is moved upward to the extreme of its upward movement, said arm and lever being pressed toward said rod by the spring $i^2$ as shown in Figs. 13 and 14, and by which said stop bars are drawn down to permit the skived blank to be discharged.

The bar $B^4$ has secured to its under side the pendent stand $j$ in position for the inner side of the upper end of the latch lever $i$ to bear against, and having its face which is toward said latch lever provided with a cam throw $j'$, which, as the plunger $g$ descends, moves said latch lever about its pivot so as to throw the arm $i'$ out of engagement with the shoulder $h^3$ and permit the spring $h^2$ to move said stop bar upward again, all as shown in Figs. 6 and 13.

The bed B has the center portion of the side toward the feed mechanism cut away from its top downward for about three fifths more or less of its depth to receive the blank severing mechanism which consists of a tubular knife carrier $k$ mounted vertically in a bearing in the bar $B^3$ and having a semi-cylindrical head $k'$, from the upper end of which project upward the two arms $k^2, k^2$, to which is secured the upper severing knife $k^3$, and has formed on the lower end of its tubular shank $k$ a series of teeth in the form of a segment of a pinion $k^4$ with which the teeth of the reciprocating rack $l$ engage to impart to said knife carrier an intermittent oscillating motion about its axis, to reverse the angle of the cut which severs a blank from the strip of material.

The tubular shank of the knife carrier $k$ has mounted therein so as to be revoluble therewith and movable vertically therein, the reciprocating knife carrier $l'$ having secured to its upper end the lower knife $l^2$ adapted to co-operate with the knife $k^3$ to sever a blank from the strip of material.

The lower end of the knife carrier $l'$ has formed thereon or secured thereto the collar or disk like plate $l^3$ which rests upon the double lifter toe $l^4$ firmly secured upon the shaft G, so as to oscillate therewith and move said knife carrier upward, to sever a blank, at each oscillation of said shaft.

The knife carrier $l'$ is moved downward, after being raised, by the tension of the springs $l^5$ secured to the disk $l^3$ and bearing at its ends against the under side of the bar $B^3$ as shown in Figs. 4 and 5.

The rack $l$ is mounted in bearings in the hangers $l^6$, $l^6$, and has secured upon its outer face the steel plate $l^7$ the ends of which form shoulders to be engaged alternately by the pawls $m$ $m$ to move said rack in opposite directions as the frame F is moved to and fro upon the bed B.

The pawls $m$ $m$ are mounted upon vertical journals formed on the lower ends of the pendent bars $m'$ $m'$ secured to and movable with the frame F and their working ends are pressed against the side of the bar H, so as to engage the ends of the plate $l^7$, by the springs $m^2$, $m^2$, secured to said bars $m'$, $m'$, all as shown in Figs. 1, 2, 4 and 5.

A rectangular bar H is secured to the frame A next to the feeding mechanism in a horizontal position just above the rack $l$ and has adjustably secured thereon the cam trip block $m^3$ having the outer portions of its opposite ends inclined to form wedge, or cam surfaces, with which the upper portions of the working ends of the pawls $m$, $m$, come in contact, as the rack $l$ is approaching the end of its movement in either direction, and are thereby thrown out of engagement with the ends of the plate $l^7$, thereby causing the movement of the rack $l$ to cease before the movement of the frame F is completed, and when the knives have assumed the proper angle for the next cut. Just outside of the lower severing knife $l^2$ is an inclined plate $n$ carried by the semi-cylindrical head $k'$ of the tube $k$, for the purpose of facilitating the discharge of the waste piece of material severed from the rear end of the strip of material.

The frame F has the central portion of one side cut away, and has secured to its upper surface, so as to span the space formed by said cut, the plate $f'$ as shown in Figs. 1 and 4.

I I are two oblique braces secured at their lower ends to the frame A and supporting at their upper ends the plates I', I' in bearings in which are mounted the shafts $I^2$ and $I^3$, and having their upper ends forked to form housings in which are fitted so as to be movable vertically therein the boxes $I^4$ in which is mounted the shaft $I^5$, and $o$ and $o'$ are grooved feed disks mounted on the shafts $I^3$ and $I^5$ respectively. The plates I' I' are firmly bolted to the outer end of the bracket like stand $I^6$ the inner end of which is bolted to the bed B as shown in Fig. 5. The plates I', I', are also bolted to the outer end of the arm $I^7$ which projects inward just above and parallel to the horizontal arm of the bracket $I^6$. The upper edge of the horizontal arm of said bracket has set in a longitudinal groove formed therein a thin plate of steel $o^2$ with its edge projecting slightly above said arm and the arm $I^7$ has a similar thin steel plate $o^3$ set in the under side with its edge parallel to the plate $o^2$ and at a distance therefrom equal to the thickness of the material to be fed to the machine, so as to prevent the strip of material being bent vertically, said strip being guided edgewise by the bars $o^4$ and $o^5$, having grooves in their inner edges directly opposite the space between the edges of the plates $o^2$ and $o^3$, said bars $o^4$ and $o^5$ being connected to the plates I', I', at their outer ends, and adjustable at their inner ends by the set screws $z$ $z$.

The boxes $I^4$ in which the upper feed shaft $I^5$ is mounted have pivoted thereto the links $o^6$, $o^6$, the upper ends of which are pivoted to the short arm of the lever K fulcrumed at $o^7$ on the stand K' mounted upon the plates I', I', with its long arm extending over the frame F nearly to its opposite edge as shown in Figs. 1, 2, and 5.

The movable end of the long arm of the lever K has secured thereon the cross arm $K^2$ to the ends of which is pivoted the gate or frame $p$ provided with the counter weight $p'$ which tends to move the lower end of said gate toward the left of Figs. 2 and 5. The lower end of the gate $p$ rests, while the strip is being fed, upon the block $p^2$ secured upon the bar $B^3$ of the bed B thereby pressing the upper feed disk down upon the strip of material with sufficient force to insure the feeding of the strip.

The gate $p$ has pivoted thereto the trip frame $p^3$ having the rib $p^4$ projecting downward therefrom near its free end, which rib is of sufficient depth to rest in the shallow groove $q$ formed in the upper surface of the bar $B^3$ and at the same time hold the free end of said frame above the upper surface of the bar $B^3$ a distance equal to the thickness of the material being fed into the machine, so that the advancing strip of material will strike said rib and push the gate $p$ from its bearing upon the block $p^2$, when the long arm of the lever K will drop until the lower end of said gate rests upon the surface of the bar $B^3$, which movement will raise the upper feed roll from contact with the material and the feed of the strip will cease.

The knife frame F has mounted in stands $q'$, $q'$, secured thereto the rod $q^2$ upon which is firmly secured the arm L provided with the pendent block $q^3$ to opposite sides of which are pivoted the presser and feed fingers $q^4$, $q^4$, beneath which the strip of material is fed and by which it is held in contact with the upper surface of the bar $B^3$ of the bed said fingers being pressed downward by the springs $q^5$, $q^5$, as shown in Figs. 1 and 5.

The bar $B^3$ has set in its upper surface beneath the presser fingers blocks or strips of rubber $r$, $r$, as shown in Figs. 1 and 5, to create friction upon the material.

The arm L has secured upon its free end the alternately acting discharge fingers $r'$, $r'$, which extend downward and outward therefrom with their under sides raised above the surface of the bar $B^3$ a distance equal to the thickness of the strip of material to be fed to the machine, and each has formed upon its upper side near its free end a shoulder $r^2$ which engages the skived or completed blank to discharge it from the mold as the frame F is reciprocated.

The lever K has pivoted thereto at $r^3$, the arm $K^3$ from the free end of which is suspended the knock-off blade $r^4$ arranged parallel to and in contact with the upper severing knife $k^3$ and is pressed downward by the spring $r^5$ so that if the strip of material has been fed to the point where the last oblique cut is to be made thereon and the blank trips the gate $p$ so as to allow the free end of the long arm of the lever K to drop said blade $r^4$ will knock off and discharge the waste piece of material.

The plate $f'$ has secured thereon the two stands $f^2$, $f^2$, in each of which is pivoted an elbow lever $f^3$ the long arm of which normally rests upon the plate $f'$ with its short arm projecting upward from its pivotal connection to said stand $f^2$ and having the end of said short arm inclined toward the center of the machine so as to act as a cam to lift the lever K, when said elbow lever is moved toward the center of the machine, and allow the gate $p$ to be swung upon the block $p^2$ and cause the feed disk $o'$ to engage the piece of material and feed it forward preparatory to severing another blank. When the elbow lever is moved in the opposite direction with the frame F, the short arm of the lever strikes the side of the lever K and is turned about its pivot till said short arm will pass beneath the lever K without raising it.

The strips of material may be presented to the feed disks by hand, if desired, and good work be accomplished but a greater saving in labor can be made by automatically feeding said strips thereto from a hopper, and therefore we provide the hopper M which is a wooden box having a width substantially corresponding to the width of the strips of material and a length somewhat greater than the length of said strips of material and is supported upon any suitable frame as M', M', with the upper surface of its bottom on the same level as the upper surface of the bed B, and the upper edge of the steel plate $o^2$ in the feed channel of the main body of the machine, and is connected to said main body by means of the hooks $s$ $s$ secured to said hopper and engaging the eyes $s'$ $s'$ set in the outer ends of the plates I' I' as shown in Figs. 1, 2, 7, and 8.

The bottom plate of the hopper M has cut through it the longitudinal slot $M^2$, in which is fitted, so as to be movable endwise thereof, the feed bar $s^2$ which has formed upon its under side the rack teeth $s^3$, and has secured to its upper side the feed plate $s^4$, of a thickness slightly less than the thickness of the strips of material to be fed which are placed within said hopper one upon another to any number within the capacity of the hopper. The front end of the hopper has formed therein a throat or opening having a vertical width sufficient to allow the lower strip in the pile to be fed through it but not high enough to permit two strips to escape therefrom at the same time. The hopper has secured to its bottom two stands $M^3$, $M^3$, one upon each side of the slot $M^2$, in which are mounted the shafts N and N', upon the former of which is firmly secured the pinion $t$ and clutch disk $t'$, and upon the latter, the spur gear wheel $t^2$ with which the pinion $t$ engages to impart to said shaft N' a rotary motion, and the gear wheel $t^3$ which meshes into, and imparts an endwise motion to the rack $s^3$ toward the main machine as shown in Figs. 7 and 8. The shaft N also has loosely mounted thereon so as to be freely revoluble about said shaft, and movable endwise thereof, the clutch disk $N^2$ to which is secured the grooved pulley $N^3$ to receive the belt $N^4$ leading therefrom to the pulley $N^5$ fixed upon the shaft $I^2$ to which rotary motion is imparted by a belt, not shown, leading from a main or counter-shaft to the pulley $N^6$.

The shaft $I^2$ has secured thereon the pinion $u$ which meshes into and imparts motion to the spur gear wheel $u'$ secured upon the shaft $I^3$, and the shaft $I^3$ has secured thereon the gear $u^2$ which engages with the gear $u^3$ on the shaft $I^5$ to impart to the upper feed disk $o'$ a rotary motion.

The feed-bar $s^2$ has secured to its rear end the cross-head O, to each end of which is secured one end of a rod O' fitted to, and movable endwise in, bearings in the stands $O^2$ and $O^3$ secured to the sides of the hopper M, and having mounted thereon between the stand $O^3$ and a collar $O^4$ adjustably secured on said rod a spiral spring $O^5$ which springs serve to normally hold said feed plunger at the extreme of its rearward movement until it is moved inward by the action of the gear $t^3$ upon the rack $s^3$.

P is a rocker shaft mounted in bearings in stands P' secured to the uprights of the frame M', and has secured thereon the arm $P^2$, opposite the end of the shaft N the upper end of which is pressed inward against the hub of the pulley $N^3$ by the spring $P^3$ with sufficient force to cause the engagement of the two parts of the friction clutch and the consequent rotation of the shafts N and N' and an inward movement of the feed plate $s^4$.

The inner end of the shaft P has firmly secured thereon the lever Q which projects horizontally therefrom toward the hopper and is connected at its movable end, by the link Q' to the lower end of the vertical rod R mounted in bearings in the stands R' R' secured to the side of the hopper so as to be movable vertically therein.

The rod R has firmly secured thereon the two collars $v$ and $v'$ between which is loosely mounted thereon the arm $v^2$ the free end of which is normally pressed toward the right of Fig. 1 by the spring $v^3$ and when the rod R is raised to the extreme of its upward movement said arm will bear against the end of the stop plate $v^4$ and rest upon the upper inclined end of the elbow lever $w$ pivoted to said stop plate in which position the arm $P^2$ is moved outward about the axis of the shaft P to permit the separation of the two parts of the clutch, when the reaction of the springs $O^5$ will cause the feed plunger $s^2$ and feed plate $s^4$ to be moved toward the outer end of the hopper. To avoid a shock to the hopper frame by said backward movement of the feed plunger we interpose springs $w^2$ between the collars $O^4$ and the stands $O^2$ to serve as cushions to deaden the blow.

The feed bar $s^2$ has secured thereto the elbow like arm S the outer portion of which is arranged parallel to the side of the hopper and has its end portion turned round, upon which is adjustably secured the block $S'$ which is provided with a downwardly projecting shank upon which is mounted so as to be adjustable about the axis of said shank the trip arm $S^2$ as shown in Figs. 7 and 8.

The inner end of the bracket $I^6$ has pivoted thereto the elbow lever $x$ with the upper edge of its horizontal arm forming an extension of the upper edge of the thin guide bar $o^2$ and has interposed between its pendent arm and the bracket $I^6$ a spring $x'$ which tends to throw the free end of the horizontal arm upward to press against the strip of material or when the strip of material is withdrawn to press against the lower edge of the guide bar or plate $o^3$ the purpose of which is to create a little extra friction upon the material as it is being fed to the severing mechanism.

The plates $I'$, $I'$, have secured between their outer ends two blocks $I^8$ and $I^9$ corresponding in thickness to the arms $I^6$ and $I^7$ and grooved to receive the outer ends of the guide plates $o^2$ and $o^3$ and the block $I^9$ has set therein in a vertical position the pin $o^8$ provided with an elongated head at its lower end, the under side of which is inclined upward toward the outer end of the feed channel, and located at one side of the plate $o^3$ with its extreme lower end in position to rest upon the strip of material when fed thereunder, and its upper end bearing against and lifting the horizontal arm of the elbow lever $w$ and throw the upwardly extending arm of said lever into position to hold up the rod R as above described and as shown in Figs. 16 and 17.

The inner face of the end of the arm $v^2$ has formed therein a notch $v^5$ to receive the outward projection $w^3$ on the upright arm of the elbow lever $w$ when the arm $v^2$ and rod R are dropped to their lowermost position; so that the pin $o^8$ may be raised by the inwardly feeding strip of material, and move the lever $w$ around its pivot into the position to support the arm $v^2$ without overcoming the tension of the spring $v^3$, as shown in Figs. 16 and 17.

Each mold $d$ has set therein two vertically movable pins $d^7$ provided at their lower ends with heads to limit their upward movements and having set in their rounded upper ends sharp inclined barbs $d^8$ which engage the under side of the blank when clamped into the mold and prevent its being displaced therein during the operation of skiving, said pins resting upon springs beneath their heads so that they may be depressed by the depressors and be moved upward again by the reaction of said springs when the depressors are raised, all as shown in Fig. 15.

The operation of my invention is as follows: The several parts of the machine being in the positions shown in the drawings, a pile of strips of leather-board having their edges skived as shown Figs. 18 and 19 are placed in the hopper M with their inner ends in contact with the inner end wall of said hopper. If the arm $v^2$ is released from the elbow lever $w$ the rod R will fall causing the rocker-shaft P to be moved about its axis, and through the pressure of the arm $P^2$ upon the hub of the pulley $N^3$ said pulley and the clutch disk $N^2$ are moved inward so as to cause said clutch disk to engage the clutch disk $t'$ fixed on the shaft N. If now power be applied to the pulley $D'$ to revolve it and cause the gear wheel $E'$ and the crank $E^2$ to be revolved in the direction indicated by the arrow on Fig. 4, and at the same time power is applied to the pulley $N^6$ in the direction indicated by the arrow on Fig. 2 the frame F will begin to move toward the left of Figs. 1 and 3, and the feed disks $o$ and $o'$ will be revolved about their axes so as to feed an object placed between them toward the right of Figs. 2 and 5, and the feed plate $s^4$ within the hopper will begin to move toward the inner end of the hopper M, and engaging the lower strip of material in the pile will feed it through the mouth of the hopper into the guide way formed by the plates $o^2$ and $o^3$ and the grooved bars $o^4$ and $o^5$ and then between the feed disks $o$ and $o'$. When the strip of material has been fairly seized by said feed disks the trip arm $S^2$ coming in contact with the arm $P^2$ moves its upper end outward from the hub of the pulley $N^3$, when the springs $O^5$ will cause the feed plunger $s^2$, feed plate $s^4$ and the arm $S^2$ to be moved backward to the extreme of their rearward movement. In the meantime the movement of the frame F toward the left of Figs. 1 and 3 has caused the pawl $m$ on the left of the center of Fig. 4 to engage the end of the plate $l'$ and move it, with the rack $l$, a sufficient distance to move the knife carriers $k$ and $l'$ about their axis of motion, so as to reverse the angle of the severing knives to the line of feed of the material, and then be disengaged therefrom by the trip block $m^3$; the depressor at the left of the center of Fig. 6 has been depressed and the depressor at the right of said figure has been raised by the tension of the spring $d^5$, and the arm L with the fingers $q^4$ and $r'$ have been moved to the extreme of their movement toward the right of Fig. 6. The feed disks $o$ and $o'$ continuing to revolve the strip of material seized thereby is being fed toward the severing knives the lower one of which has been moved upward by the action of the lifter toe $l^4$ upon the disk $l^3$. The crank $E^2$ having now reached a horizontal position the frame F, the skiving knives, $e$ $e$, the arm L, the fingers $q^4$ and $r'$ and the pawls $m, m$, begin to move in the opposite direction, or toward the right of Figs. 1 and 3, and as said frame moves in that direction the severing knife $l^2$ descends the strip of material is fed between the severing knives, and beneath one of the fingers $q^4$ until the end of the strip strikes the trip frame $p^3$, and pushes the gate $p$ off the block $p^2$, when the long arm of the lever $k$ falls, and assisted by the springs $y, y$, raises the feed disk from contact with the material and the feed of the strip of material ceases temporarily, the severing knives are again turned into the angular position shown in Fig. 1 and the knife $l^2$ is raised to sever a blank from the strip and at about the same time the beveled upper end of the short arm of the elbow lever $f^3$ at the right of the center of Fig. 4 passes beneath the lever K and raises its long arm causing the feed disk $o'$ to descend again into contact with the material and commence to feed the same again. Just at the time that the blank is severed from the strip by the upward movement of knife $l^2$ the finger $q^4$ comes in contact with the short edge of the severed blank to move it transversely toward the mold $d$ at the left of the center of Fig. 1, and at the same time the depressor in said mold is raised, and if there is a skived blank in said mold it is moved upward into an inclined position with its inner edge the highest, by the spring pressed spur pins $d^7$, assisted by the natural elasticity of the blank itself, so that the newly severed blank resting on the surface of the bed may be fed into or upon the mold while at the same time the shoulder of the finger $r'$ engages the raised inner edge of the skived blank with the extreme end portion of said finger beneath said blank and moves it edgewise from the mold till it falls by gravity into any suitable chute or receptacle, in advance of the newly severed blank. Before the newly severed blank has reached the extreme of its lateral movement the stop fingers $h'$ are thrown upward by the tension of the spring $h^2$ so as to prevent said blank being fed too far over the mold. In the meantime the strip of material is being fed forward, and the severing knives have been turned so as to reverse the angle thereof to the line of feed, and as its end strikes the trip frame $p^3$ the gate $p$ is pushed off the block $p^2$, the long arm of the lever K falls, the feed disk is raised, and the feed of the strip of material ceases for the time being, the severing knives are raised, and another blank is severed from the strip. The frame F, with the skiving knives and the lateral feed mechanism, commence to move toward the right of Figs. 1, and 3, the first effect of which, is the forcing down of the depressor at the left of the center of Fig. 1, to clamp the blank within the mold, by the passage of the rolls $e'$ upon the higher and straight parts of the ear ribs $d^4$ of said depressor. Just when the blank is firmly clamped in the mold the skiving knife $e$ comes into contact with and begins to cut away the surplus material projecting above the upper boundary surface of the mold, and during this operation the cutting punch $g^2$ is moved upward and co-operating with the die $g^3$ cuts the notch $h$ in the center of the straight edge of the blank as shown in Fig. 20, and by the continued movement of the frame F and the parts mounted thereon toward the right of Fig. 1 the blank last severed from the strip is fed upon the mold and beneath the depressor at the right of the center of Fig. 1, and the skived blank in said mold, if one is there, is discharged. These operations are repeated at each endwise movement of the frame F until the end of the strip passes from under the pin $o^8$ when it with the horizontal arm of the elbow lever $w$ will drop thus tripping the support from beneath the arm $v^2$ when the rod R will drop causing the rocker-shaft P to be moved about its axis, and the arm $P^2$ to move the disk $N^2$ into contact with the disk $t'$ when the feed plate $s^4$ will be moved inward pushing in front of it the bottom strip of material in the hopper as before described.

What we claim as new, and desire to secure by Letters Patent of the United States, is—

1. In a machine for cutting heel stiffener blanks, the combination of a pair of severing knives mounted upon oscillating carriers and arranged with their cutting edges at an angle to the line of feed of the material to be severed, and to receive said material between them, and movable one toward the other; and means for moving said knives about their axis of revolution from an angle to said line of feed in one direction to a corresponding angle in the opposite direction.

2. In a machine for cutting heel stiffener blanks from strips of leather-board or other material the combination of a pair of severing dies mounted on oscillating carriers and arranged with their cutting edges at an angle to the line of feed of said strip of material to be severed, to receive said strip between them and movable one toward the other to sever said material; means for intermittently oscillating said knives from a position at an angle to the line of feed of the material in one direction to the corresponding angle in the opposite direction; and means for intermittently feeding said strip of material endwise a distance, at each movement, equal to the mean length of blank to be cut.

3. In a machine for cutting heel stiffener blanks, the combination of a fixed bed; a pair of molds having formed in their outer faces, recesses, the outlines of which correspond to the desired outlines to be given to the blanks when completed with the outer faces of their rims in the same plane and their rounded edges toward each other; a pair of depressors for pressing the severed blanks into said molds; a reciprocating frame mounted upon said bed; a pair of skiving knives carried by said frame and arranged with their cutting edges in the same plane and toward each other; means for operating the depressors to clamp the blanks in the molds; and means for reciprocating said frame and skiving knives.

4. In a machine for cutting heel stiffener blanks, the combination of a rotary feed mechanism constructed and arranged to intermittently feed a strip of material endwise a distance, at each intermittent movement, equal to the mean length of the desired blank; an oscillating knife constructed and arranged to sever a blank from said strip at an angle to the line of movement in one direction, and then be turned about its axis and sever the next blank at a corresponding angle in the opposite directions; a pair of molds arranged on opposite sides of the path of movement of said strip of material, and with the outer faces of their rims in the same plane; a pair of depressors for clamping a blank in each of said molds; a pair of reciprocating skiving knives arranged with their cutting edges toward each other and in the same plane; and means for feeding a severed blank into one mold while a blank in the other mold is being skived.

5. In a machine for cutting heel stiffener blanks, the combination of a pair of rotary feed rolls or disks, mounted one in fixed bearings and the other in movable bearings; a pivoted lever connected at one end to said movable bearings; a gate or prop frame pivoted to the opposite end of said lever and arranged to rest, at its lower end, upon a raised block, to cause said feed disks to engage and feed the strip of material; and a trip-frame constructed and arranged to be struck by the end of said strip of material and trip said gate when the strip has been fed the desired distance, and separate said feed disks and stop the feed.

6. In a machine for cutting heel stiffener blanks, the combination of a fixed bed; a pair of molds mounted on said bed, and having formed in their outer faces recesses, the outlines of which correspond to the outlines to be given to the completed blanks, and having the outer faces of their rims in the same plane, and the curved sides of said recesses toward each other; a pair of pivoted depressors to co-operate with said molds to clamp the blanks therein, and each provided with cam surfaces to be acted upon to depress said depressors; a reciprocating frame mounted on said bed; anti-friction rolls carried by said frame and adapted to roll upon said bed, and act upon said cam surfaces to operate the depressors; a pair of skiving knives carried by said frame with their cutting edges toward each other and in the same plane, and arranged to co-operate with the rims of said molds to cut away all surplus material projecting above the rims of said molds.

7. In a machine for cutting heel stiffener blanks, the combination of a fixed bed; a reciprocating frame mounted on said bed; a pair of co-operating severing knives mounted on oscillating carriers mounted in a bearing in said bed, the inner carrier being movable endwise in a bearing in the outer carrier; a series of gear teeth formed on said outer carrier; an endwise movable rack engaging the teeth on said carrier; a pair of pawls carried by said reciprocating frame and arranged to alternately engage said rack to move it in opposite directions; a cam or wedge block to trip said pawls when the rack has moved the required distance; and a double acting lifter toe for moving the inner knife carrier endwise, to sever a blank, at each endwise movement of said frame.

8. In a machine for cutting heel stiffener blanks, the combination of a fixed bed; a pair of molds carried by said bed with the outer faces of their rims in the same plane; a pair of pivoted depressors arranged to co-operate with said molds to clamp the blanks therein, and each provided with a female cutting die; a reciprocating frame mounted on said bed; a pair of skiving knives carried by said frame with their cutting edges toward each other, and in the same plane, and arranged to co-operate with the rims of said molds to cut away all surplus material projecting from said molds; a rocker shaft mounted in fixed bearings; a radius arm secured upon said shaft and engaging at its movable end a stud set in said reciprocating frame; a two armed lever firmly secured to said rocker-shaft; and a pair of reciprocating punches or male dies connected one to each end of said two armed lever and arranged to co-operate with the female dies in said depressors to cut the notch $h$ in the center of the straight edge of the blank.

9. In a machine for cutting heel stiffener blanks, the combination of a fixed bed; a pair of molds mounted thereon with the outer faces of their rims in the same plane; a pair of depressors to co-operate therewith to clamp the blanks; a reciprocating frame mounted on said bed; a stud set in the side of said frame; a pair of skiving knives carried by said frame with their cutting edges toward each other and in substantially the same plane as the outer faces of the rims of said molds; a rocker-shaft mounted in fixed bearings; a lever secured on said rocker-shaft and engaging at its movable end said stud; a two armed lever secured on said rocker-shaft; two vertically reciprocating plungers mounted in bearings in said bed and connected one to each end of said two armed lever; two pairs of vertically movable stop bars provided with shoulders at their lower ends; springs for moving said stops upward; a pair of latch levers carried by each of said vertically reciprocating plungers and adapted to engage the shoulders on said stop bars, to retract them against the tension of said springs; and a pair of fixed cams for disengaging said latch levers from said stop bars.

10. In a machine for cutting heel stiffener blanks the combination of a fixed bed; a fixed or stationary mold carried thereby; a pivoted depressor for clamping a blank in said mold;

a reciprocating frame or carriage; a skiving knife carried by said reciprocating frame; anti friction rolls carried by, and supporting said frame, and operating to depress the depressor plate; and means, carried by said frame, for feeding a freshly severed blank into said mold, and at the same time discharge a completed blank therefrom.

11. In a machine for cutting heel stiffener blanks, the combination of a pair of fixed molds arranged with their faces in the same plane and with the curved sides of their recesses toward each other; a reciprocating frame or carriage; a pair of skiving knives carried by said frame with their cutting edges toward each other and in the same plane; a pair of pivoted depressors; anti-friction rolls carried by said frame and arranged to act upon said depressors to clamp the blanks in said molds; means carried by said frame for alternately feeding a freshly severed blank to each of said molds; and means carried by said frame for alternately discharging a skived blank from each of said molds.

12. In a machine for cutting heel stiffener blanks from strips of leather board or other material, the combination of the following instrumentalities viz, a hopper to receive a pile of said strips; a reciprocating feed plate and mechanism for operating the same, constructed and arranged to feed the bottom strip through the mouth of the hopper a given distance; means for stopping said feed at a given point and retracting said plunger; a rotary feeding mechanism constructed and arranged to seize said strip when the plunger feed is arrested and intermittently feed said strip a distance equal to the mean required length of blank; a tripping mechanism operated by the contact therewith of the end of the strip of material being fed and serving to arrest the rotary feed;—a pair of fixed molds arranged one on each side of the path of movement of said strip with their upper faces in the same plane with each other and with the under side of the strip of material; a pair of depressors co-operating with said molds to clamp the blanks therein; a reciprocating frame or carriage; a pair of skiving knives carried by said frame with their cutting edges toward each other and in the same plane; a pair of oscillating severing knives constructed arranged and operating to sever blanks from said strip alternately at opposite angles to the line of feed of said strip; and means for alternately feeding a severed blank into each of said molds and discharging a skived one therefrom.

13. In a machine for cutting heel stiffener blanks, the combination of a pair of feed wheels mounted one in fixed bearings and the other in movable bearings and adapted to intermittently feed a strip of material a distance equal to the mean length of the required blank; a knife carrier having a tubular shank, a semi-cylindrical head at its upper end and a series of pinion teeth on its lower end; the knife $k^3$ secured to the head of said carrier; the knife carrier $l'$ mounted and movable vertically in a bearing in said tubular shank; the knife $l^2$ carried at its upper end; the disk $l^3$ on its lower end; the reciprocating frame F; the stud $g$; the rocker-shaft G; the arm G' the lifter toe $l^4$; the rack $l$; the shoulder plate $l^7$; the pawls $m$ $m$ the springs $m^2$ and $l^5$; the bar H; and the trip block $m^3$.

14. In a machine for cutting heel stiffener blanks, the combination of a pair of feed rolls or disks mounted one in fixed bearings and the other in movable bearings; a pivoted lever connected at the end of its short arm with said movable bearings and its long arm extending over the bed of the machine; a gate or prop frame pivoted to said long arm so as to be adjustable thereon and arranged to rest at its lower end upon a raised block when the strip is being fed by said rolls or disks; a trip frame to be struck by the end of the moving strip and knock said prop frame off said raised block and arrest the feed of the strip; a pair of severing knives carried by oscillating carriers mounted one within the other; means for oscillating said knife carriers together about a common axis; means for moving one of said knives toward the other to sever a blank; the knock off plate $p^4$ arranged at the outer side of the upper knife $k^3$; the lever $k^3$ pivoted to the feed disk carrying lever; the adjustable connection between the lever $k^3$ and the plate $p^4$; and the spring $r^5$.

15. In a machine for cutting heel stiffener blanks, the combination of the hopper M provided with a throat or mouth to permit the discharge of only one strip of material at the same time; the reciprocating feed plunger $s^2$ $s^4$; the rack $s^3$; the shafts N and N'; the clutch disks $N^2$ and $t'$; the pinion $t$; the gear wheel $t^2$ and $t^3$; the pulley $N^3$; the rocker-shaft P; the arm $P^2$; the spring $P^3$; the lever Q; the rod R connected at its lower end to said lever Q; the arm $v^2$; the spring $v^3$; the trip arm $S^2$; the belt $N^4$; the pulleys $N^5$ and $N^6$; the shafts $I^2$ and $I^3$ mounted in fixed bearings; the shaft $I^5$ mounted in movable bearings; a train of gear wheels connecting said shafts $I^2$ $I^3$ and $I^5$; the feed disks $o$ and $o'$; the lever K; the gate $p$; the counter weight $p'$; the block $p^2$; the trip frame $p^3$ $p^4$; the stop plate $v^4$; the trip lever $w$; and the pin $o^8$, all constructed, arranged and operating to automatically feed a strip of material intermittently to the severing knives.

16. In a machine for cutting heel stiffener blanks, the combination of the feed disks $o$ and $o'$ one mounted in fixed bearings and the other in movable bearings; the lever K connected at one end to said movable bearings; the gate $p$; the block $p^2$; the counter weight $p'$; the trip frame $p^3$ $p^4$; a guide way for the strip to be fed composed of the grooved bars $o^4$ and $o^5$ and the plates $o^2$ and $o^3$; the elbow lever $x$ forming an extension of the plate $o^2$;

and the spring $x'$ arranged to press the horizontal arm of said lever upward against the material being fed to the severing knives.

17. In a machine for cutting heel stiffener blanks, the combination of a fixed mold provided with a recess having an outline corresponding to the desired outline to be given to the finished blank; a pivoted depressor constructed and arranged to clamp a severed blank in said mold; a yielding barbed pin set in said mold with its barb projecting into the recess of said mold; means for operating said depressor to clamp the blank in said mold; a reciprocating skiving knife constructed and arranged to cut away the surplus material projecting from said mold; and feeding mechanism constructed and arranged to feed a severed blank laterally into said mold and at the same time discharge the skived blank therefrom.

In testimony whereof we have signed our names to this specification, in the presence of two subscribing witnesses, on this 9th day of March, A. D. 1895.

DANIEL L. CHANDLER.
GEORGE J. BURNS.

Witnesses:
N. C. LOMBARD,
WALTER E. LOMBARD.